Patented Dec. 25, 1951

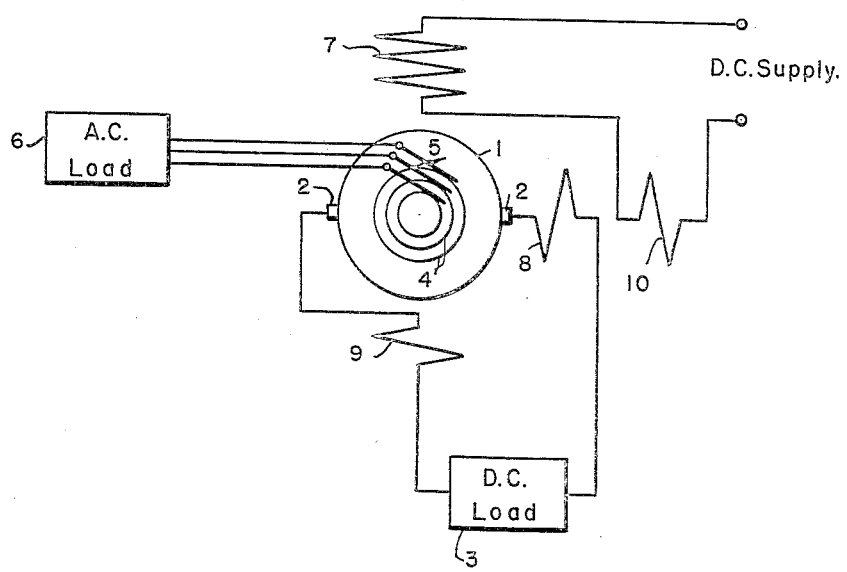

2,579,579

UNITED STATES PATENT OFFICE 2,579,579

DIRECT-CURRENT GENERATOR

Dillon B. Hoover, Pittsburgh, Pa., assignor to Westinghouse Electric Corporation, East Pittsburgh, Pa., a corporation of Pennsylvania Application June 30, 1949, Serial No. 102,245

4 Claims. (Cl. 322—90)

The present invention relates to direct-current generators, and more particularly to the commutation of direct-current generators which supply an alternating-current load in addition to the direct-current load.

It is sometimes desired to supply an alternating-current load from a direct-current generator, in addition to the normal direct-current load, in order to avoid the necessity of providing two separate machines, especially when the alternating-current load is relatively small as compared to the direct-current load. This can readily be done by providing slip-rings on the commutator of the direct-current generator, and connecting the slip-rings to the proper points in the armature winding to provide either single-phase or polyphase alternating current. When this is done, however, the commutation of the generator is seriously disturbed. Direct-current generators are commonly provided with commutating field windings which are connected in series with the armature, and which provide the proper commutating flux to ensure good commutation. When an alternating-current load is taken from the armature in addition to the normal direct-current load, however, the commutation is disturbed, since the amount of commutating flux provided by the usual commutating field winding is determined only by the direct-current load. For this reason, direct-current machines which also supply an alternating-current load have very poor commutation unless special means are provided to improve the commutation. This can be done by means of auxiliary commutating field windings, but such windings have required relatively complicated arrangements for providing the proper excitation, which must vary with the alternating-current load.

The principal object of the present invention is to provide a direct-current generator which is adapted to also supply a substantially constant alternating-current load, and in which good commutation is obtained in a very simple manner.

Another object of the invention is to provide a direct-current generator which is adapted to also supply a substantially constant alternating-current load, and in which good commutation is obtained very simply by providing an auxiliary commutating field winding with substantially constant excitation.

A further object of the invention is to provide a direct-current generator which is adapted to also supply a substantially constant alternating-current load, and in which an auxiliary commutating field winding is provided, and excited from the main field winding circuit of the generator, so as to obtain substantially constant excitation in a very simple manner.

The invention will be more fully understood from the following detailed description, taken in connection with the accompanying drawing, in which the single figure is a schematic diagram illustrating a preferred embodiment of the invention.

The invention is shown in the drawing embodied in a direct-current generator having an armature, diagrammatically indicated at 1, which has a commutator engaged by brushes 2 connected to supply the direct-current load 3. The armature also has three slip-rings 4 mounted on it and connected to the proper points in the armature winding to provide three-phase alternating current. The slip-rings 4 are engaged by brushes 5 which are connected to a three-phase alternating current load 6. It will be apparent that a single-phase load might be supplied instead of a three-phase load, in which case only two slip-rings would be required.

The generator is provided with a main shunt-type field winding 7 to provide the main field flux of the machine. The main field winding 7 is shown as being separately excited, but it will be understood that the winding 7 might be excited from the voltage of the generator itself, or it may be excited in any suitable manner to provide the required main field flux. The generator is also provided with a main commutating field winding 8, preferably disposed on commutating poles, and connected in series with the armature 1 so as to carry the direct-current load, and thus provide the proper commutating field flux for any value of direct-current load. A series main field winding 9 may also be provided, if desired, on the main poles of the generator and connected in series with the armature.

As previously explained, the presence of the alternating-current load will seriously disturb the commutation of the machine, if it is provided only with the conventional commutating field winding 8. For this reason, an additional auxiliary component of commutating field flux must be provided if good commutation is to be obtained. The generator of the present invention is intended to supply only a substantially constant alternating-current load 6, and this makes it possible to supply the required additional commutating flux in a very simple manner. For this purpose, an auxiliary commutating field winding 10 is placed on the commutating poles to provide the necessary additional component of commutating flux to compensate for the effect of the alternating-current load. Since the alternating-current load 6 is substantially constant, the auxiliary commutating field winding 10 has substantially constant excitation, which is adjusted to the necessary value by designing the winding 10 to provide the required ampere-turns. The constant excitation of the winding 10 may be adjusted, if necessary, for different values of A. C. load current by inserting resistance in the circuit, or in any other suitable manner.

The required substantially constant excitation of the winding 10 may be obtained in any desired manner. If the machine is operated with substantially constant main field excitation, it is preferred to excite the winding 10 from the circuit of the main field winding 7, preferably by connecting the auxiliary commutating winding 10 in series with the main field winding 7, as shown in the drawing. This results in a very simple arrangement for obtaining the required constant excitation, and it has the further advantage that when the machine is being started, the correct excitation is obtained throughout the starting period. The alternating-current and the direct-current voltage are both brought up together, and since the excitation of the auxiliary commutating field winding 10 is obtained from the main field winding circuit, the correct commutating flux is obtained throughout the starting period and no sparking occurs at the brushes.

A preferred embodiment of the invention has been shown and described for the purpose of illustration, but it will be apparent that various other embodiments and modifications are possible within the scope of the invention. Thus the auxiliary commutating field winding 10 may be excited from any substantially constant direct-current source, such as the voltage of the generator itself, or any external direct-current source such as a battery. It is to be understood, therefore, that the invention is not limited to the specific embodiment shown and described, but in its broadest aspects it includes all equivalent embodiments and modifications which come within the scope of the appended claims.

I claim as my invention:

1. A direct-current generator adapted to be mechanically driven to supply a direct-current load and a substantially constant alternating-current load, said generator having an armature member and a field member, said armature member having a winding connected to a commutator and to slip-rings, brushes engaging the commutator for supplying said direct-current load, brushes engaging the slip-rings for supplying said substantially constant alternating-current load, a single shunt-type main field winding disposed on said field member, a main commutating field winding on the field member connected in series with the direct-current load, an auxiliary commutating field winding on the field member, and means for supplying substantially constant direct-current excitation to said auxiliary commutating field winding.

2. A direct-current generator adapted to be mechanically driven to supply a direct-current load and a substantially constant alternating-current load, said generator having an armature member and a field member, said armature member having a winding connected to a commutator and to slip-rings, brushes engaging the commutator for supplying said direct-current load, brushes engaging the slip-rings for supplying said substantially constant alternating-current load, a single shunt-type main field winding disposed on said field member, a main commutating field winding on the field member connected in series with the direct-current load, and an auxiliary commutating field winding on the field member, said auxiliary commutating field winding being excited from the circuit of said main field winding for substantially constant excitation.

3. A direct-current generator adapted to be mechanically driven to supply a direct-current load and a substantially constant alternating-current load, said generator having an armature member and a field member, said armature member having a winding connected to a commutator and to slip-rings, brushes engaging the commutator for supplying said direct-current load, brushes engaging the slip-rings for supplying said substantially constant alternating-current load, a single shunt-type main field winding disposed on said field member, a main commutating field winding on the field member connected in series with the direct-current load, and an auxiliary commutating field winding on the field member, said auxiliary commutating field winding being connected in series with said main field winding for substantially constant excitation.

4. A direct-current generator adapted to be mechanically driven to supply a direct-current load and a substantially constant alternating-current load, said generator having an armature member and a field member, said armature member having a winding connected to a commutator and to slip-rings, brushes engaging the commutator for supplying said direct-current load, brushes engaging the slip-rings for supplying said substantially constant alternating-current load, a single shunt-type main field winding disposed on said field member, means for supplying substantially constant direct-current excitation to said main field winding, a main commutating field winding on the field member connected in series with the direct-current load, and an auxiliary commutating field winding on the field member, said auxiliary commutating field winding being connected in series with the main field winding.

DILLON B. HOOVER.

REFERENCES CITED

The following references are of record in the file of this patent:

UNITED STATES PATENTS

| Number | Name | Date |
| --- | --- | --- |
| 1,910,473 | McNeil | May 23, 1933 |
| 2,385,199 | Fisher | Sept. 18, 1945 |

FOREIGN PATENTS

| Number | Country | Date |
| --- | --- | --- |
| 158,894 | Great Britain | June 12, 1922 |
| 276,603 | Great Britain | Sept. 1, 1927 |